US007218647B2

(12) United States Patent
Ozguner (10) Patent No.: US 7,218,647 B2
(45) Date of Patent: *May 15, 2007

(54) METHOD AND APPARATUS FOR IMPLEMENTING FRAME HEADER ALTERATIONS

(75) Inventor: Tolga Ozguner, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1021 days.

This patent is subject to a terminal disclaimer.

(21) Appl. No.: 10/185,552

(22) Filed: Jun. 27, 2002

(65) Prior Publication Data

US 2004/0003110 A1   Jan. 1, 2004

(51) Int. Cl.
*H04J 3/06* (2006.01)
*H04L 12/28* (2006.01)

(52) U.S. Cl. .............. 370/471; 370/412; 370/389; 370/503

(58) Field of Classification Search ........... 370/389, 370/390, 489, 395.5, 463, 392, 419, 474, 370/412; 712/21, 22, 200, 201, 203, 204, 712/206

See application file for complete search history.

(56) References Cited

U.S. PATENT DOCUMENTS 5,168,561 A * 12/1992 Vo ..................... 710/22
5,857,113 A * 1/1999 Muegge et al. ......... 710/10
6,731,652 B2 * 5/2004 Ramfelt et al. ......... 370/489
7,000,097 B2 * 2/2006 Senter et al. ........... 712/245

OTHER PUBLICATIONS

U.S. Appl. No. 180,993, filed Jun. 27, 2002, entitled "Method and Apparatus for Implementing Alterations on Multiple Concurrent Frames".
U.S. Appl. No. 185,556, filed Jun. 27, 2002, entitled "Method and Apparatus for Implementing Frame Header Alterations Using Byte-Wise Arithmetic Logic Units".

* cited by examiner

*Primary Examiner*—Hanh Nguyen
(74) *Attorney, Agent, or Firm*—Joan Pennington (57) ABSTRACT

A method and apparatus are provided for implementing frame header alterations in a network processor. A command decoder receives and decodes frame alteration commands and provides frame alignment commands and alteration instructions. A data aligner receives frame data and is coupled to the command decoder receiving the frame alignment commands. The data aligner includes an insert and delete unit that sequentially receives a predefined number of bytes of frame data, selectively latches data bytes of the received predefined number of bytes of frame data responsive to the frame alignment commands and sequentially provides an aligned frame data output of the predefined number of bytes. An alteration engine is coupled to the data aligner receiving the sequential aligned frame data output and is coupled to the command decoder receiving the alteration instructions. The alteration engine provides sequential altered frame data responsive to the received alteration instructions.

17 Claims, 7 Drawing Sheets

ETHERNET FRAME FORMAT 300   PRIOR ART

FIG. 3A

PACKET OVER SONET FORMAT 310   PRIOR ART

PRIOR ART

FIG. 7

METHOD AND APPARATUS FOR IMPLEMENTING FRAME HEADER ALTERATIONS

FIELD OF THE INVENTION

The present invention relates generally to the data processing field, and more particularly, relates to a method and apparatus for implementing frame header alterations.

RELATED APPLICATIONS

Related United States patent applications by the present inventor and assigned to the present assignee are being filed on the same day as the present patent application including:

U.S. patent application Ser. No. 10/180,993, entitled "METHOD AND APPARATUS FOR IMPLEMENTING ALTERATIONS ON MULTIPLE CONCURRENT FRAMES; and U.S. patent application Ser. No. 10/185,556, entitled "METHOD AND APPARATUS FOR IMPLEMENTING FRAME HEADER ALTERATIONS USING BYTE-WISE ARITHMETIC LOGIC UNITS".

DESCRIPTION OF THE RELATED ART

One of the main functions of a network processor is to take incoming packets or frames, and perform alterations on the headers for the purpose of implementing certain network protocols as required by a particular application. These alterations can be done in a core processor, but they can often be time consuming and result in high latency and failure to meet the bandwidth requirements of the application.

A higher performance alternative is to have designated logic to perform alterations on frames as instructed by the core processor. In this scenario, a frame or packet comes into the chip, is classified according to its contents, and depending on the software load, dispatched to a frame alteration unit (FAU) with a list of alterations to be performed. The FAU in turn reads the frame or packet data from storage, applies the necessary alterations, and sends the data back out to the network or to another chip in the system for further processing or routing.

Limited speed or the required time to perform the frame alterations remains a significant problem with known frame alteration arrangements. Also known frame alteration arrangements typically are restricted to predefined alterations, lacking the flexibility required to perform frame alterations in a wide variety of protocols and multiple alteration formats that currently exist or that will be developed in the future.

A need exists for an improved mechanism and method for implementing frame header alterations.

SUMMARY OF THE INVENTION

A principal object of the present invention is to provide a method and apparatus for implementing frame header alterations. Other important objects of the present invention are to provide such method and apparatus for implementing frame header alterations substantially without negative effect and that overcome many of the disadvantages of prior art arrangements.

In brief, a method and apparatus are provided for implementing frame header alterations in a network processor. A command decoder receives and decodes frame alteration commands and provides frame alignment commands and alteration instructions. A data aligner receives frame data and is coupled to the command decoder receiving the frame alignment commands. The data aligner includes an insert and delete unit that sequentially receives a predefined number of bytes of frame data, selectively latches data bytes of the received frame data responsive to the frame alignment commands and sequentially provides an aligned frame data output of the predefined number of bytes. An alteration engine is coupled to the data aligner receiving the sequential aligned frame data output and is coupled to the command decoder receiving the alteration instructions. The alteration engine provides sequential altered frame data responsive to the received alteration instructions.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
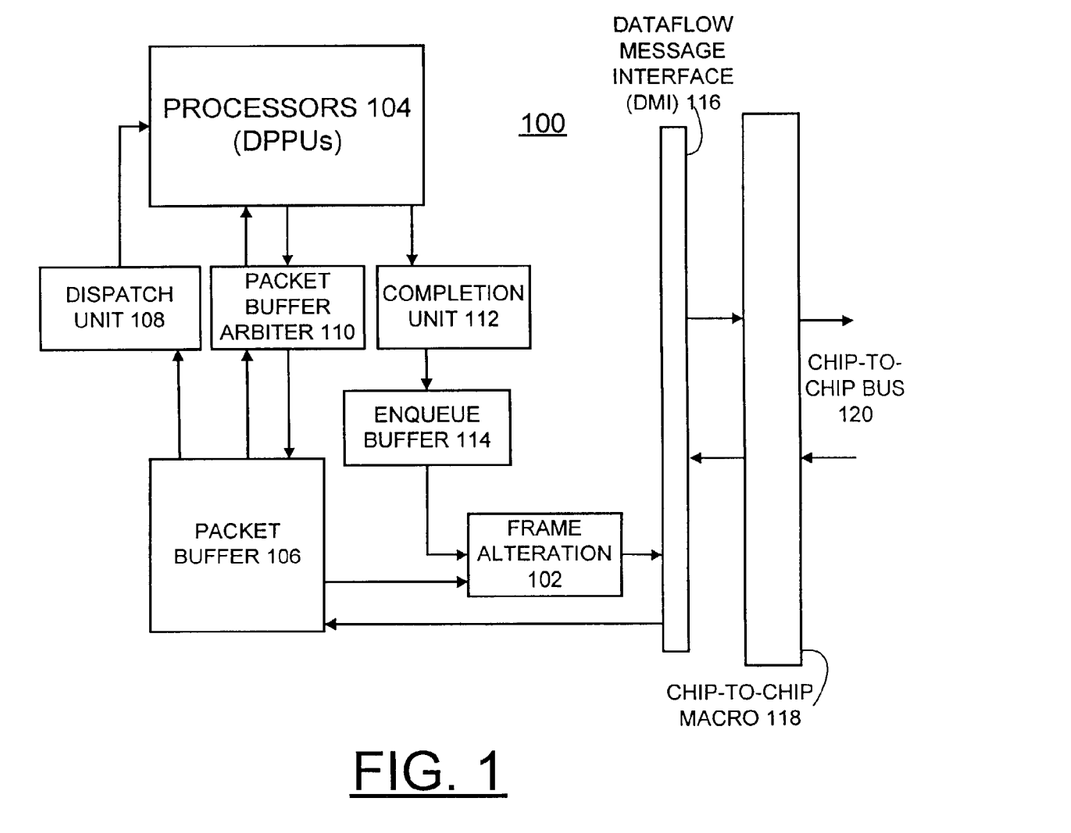
FIG. 1 is block diagram illustrating a data and storage network processor including a frame alteration unit (FAU) in accordance with the preferred embodiment.

Having reference now to the drawings, in FIG. 1, there is shown a data and storage network chip or network processor 100 including a frame alteration unit (FAU) 102 in accordance with the preferred embodiment. Network processor 100 is shown in simplified form sufficient for understanding the present invention.

Network processor 100 includes a plurality of processors 104, such as distributed pico processor units (DPPUs), and a packet buffer 106 coupled to the processors or DPPUs 104 by a dispatch unit 108 and a packet buffer arbiter 110. The packet buffer 106 receives and stores incoming packet data or frames in an on-chip array, builds descriptors for the frames, and then queues the frames for processing by the processors or DPPUs 104. The dispatch unit 108 sends the frame descriptors to the processors or DPPUs 104. Proces sors or DPPUs 104 can access packet buffer data via the packet buffer arbiter 110. The packet buffer arbiter 110 has access to all of the memory locations inside of the packet buffer 106. Processors or DPPUs 104 can alter a frame by going through the packet buffer arbiter 110 into the packet buffer 106 and work with the frame in the on-chip array within the packet buffer 106. However, altering the frame in this way can be time consuming.

In accordance with the preferred embodiment, processors or DPPUs 104 create and send frame alteration (FA) commands to the frame alteration unit 102 facilitating faster frame alterations. Once a particular DPPU 104 creates the FA commands, the DPPU sends the frame descriptors along with the FA commands to the frame alteration unit 102 via a completion unit 112, and an enqueue buffer 114. Frame alteration unit 102 receiving the frame descriptors and FA commands, performs frame alterations and sends the altered frame via a dataflow message interface (DMI) 116 and chip-to-chip macro 118 to a chip-to-chip bus 120.

Figure 2A:
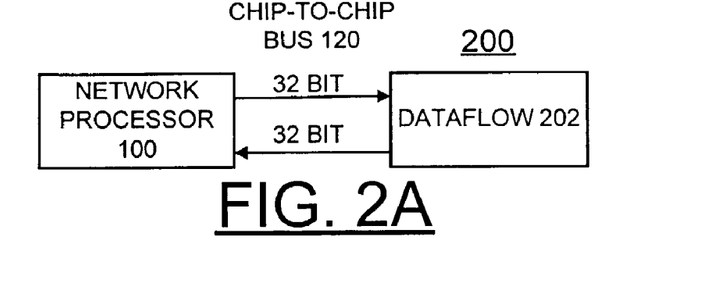
FIGS. 2A, 2B, and 2C are diagrams illustrating exemplary multiple point-to-point bus configurations of the data and storage network processor of FIG. 1 in accordance with the preferred embodiment.
Figure 2B:
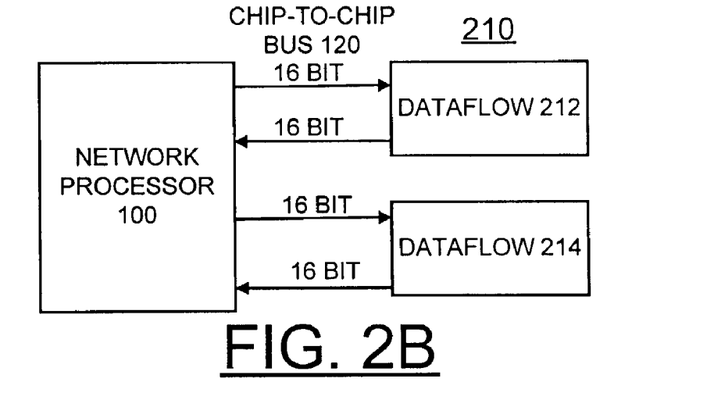
Figure 2C:
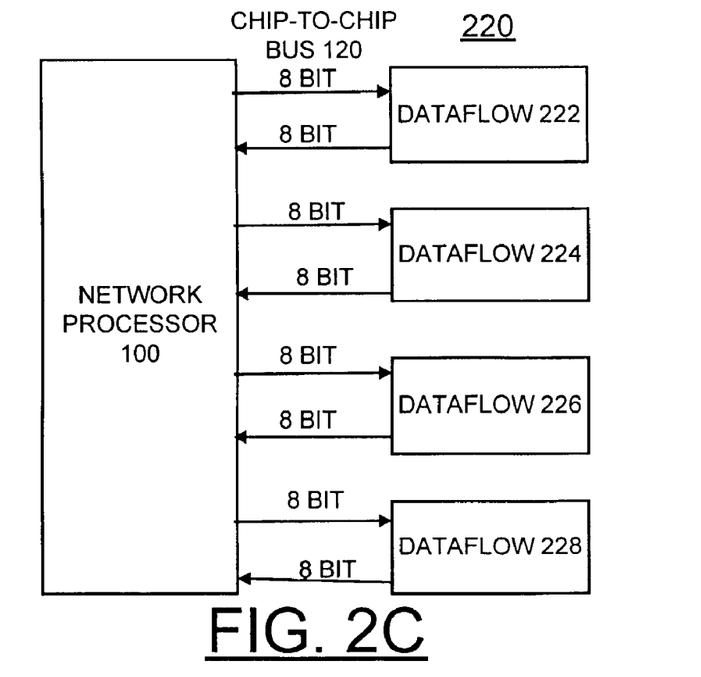

Referring now to FIGS. 2A, 2B, and 2C, exemplary multiple programmable point-to-point bus configurations of the 32-bit chip-to-chip bus 120 selectively configured in various combinations of a 32-bit, 16-bit or 8-bit busses of the data and storage network processor 100. FIG. 2A illustrates a first configuration generally designated by 200 of the network processor 100 with the chip-to-chip bus 120 configured as 32-bit bus for a single destination dataflow 202. FIG. 2B illustrates a second configuration generally designated by 210 of the network processor 100 with the chip-to-chip bus 120 configured as 16-bit busses for a pair of independent dataflows 212 and 214. FIG. 2C illustrates a third configuration generally designated by 220 of the network processor 100 with the chip-to-chip bus 120 configured as 8-bit busses for four independent dataflows 222, 224, 226, and 228.

In accordance with features of the preferred embodiment, frame alteration unit 102 has high performance capability, for example, to perform frame alterations at a rate of 16 GB/s. Frame alteration unit 102 has the ability to dynamically provide more bandwidth to destinations with higher bandwidth requirements. Frame alteration unit 102 has the ability to perform alterations on 4 frames concurrently in order to minimize inter frame latency in a high bandwidth application as shown in FIG. 2A, or to provide lower bandwidth for two or four destinations as shown in FIGS. 2B and 2C.

Frame alteration unit 102 operates in two major modes including a full-bus mode and split-bus mode. Frame alteration unit 102 operates in full-bus mode with a single destination for the frames with a high bandwidth requirement, for example, 16 GB/s. Frame alteration unit 102 operates in split-bus mode with either two or four independent destinations for frames, each with either one-half the bandwidth requirement for two destinations, for example, 8 GB/s, or one-quarter the bandwidth requirement for four destinations, for example, 4 GB/s.

Figure 3A:
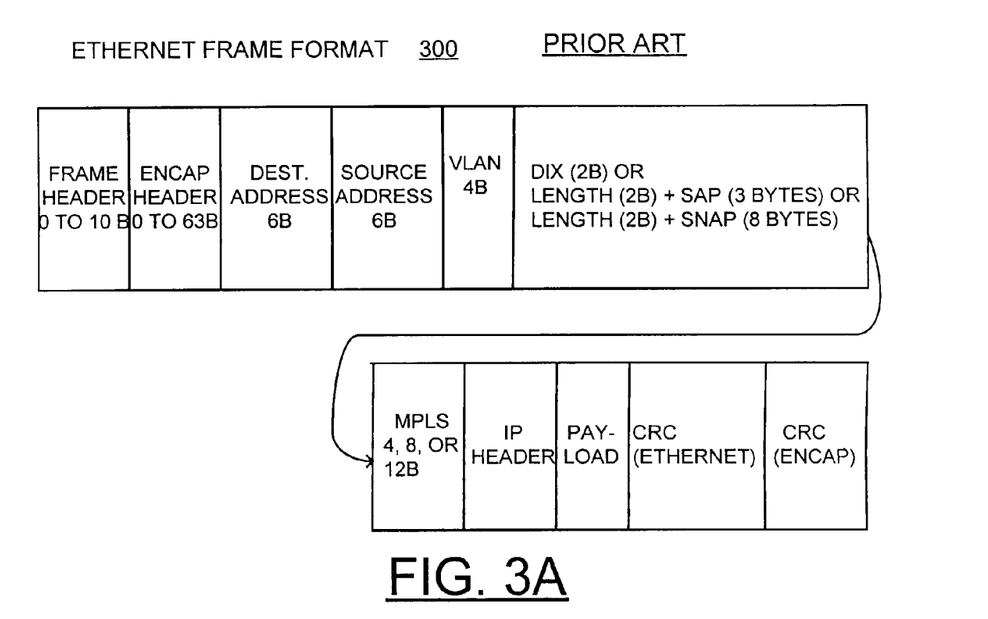
FIGS. 3A and 3B are diagrams respectively illustrating a conventional format of an Ethernet frame and Packet over Sonet (POS) packet that include multiple header fields that can be changed, inserted or deleted using the frame alteration unit (FAU) in accordance with the preferred embodiment.
Figure 3B:
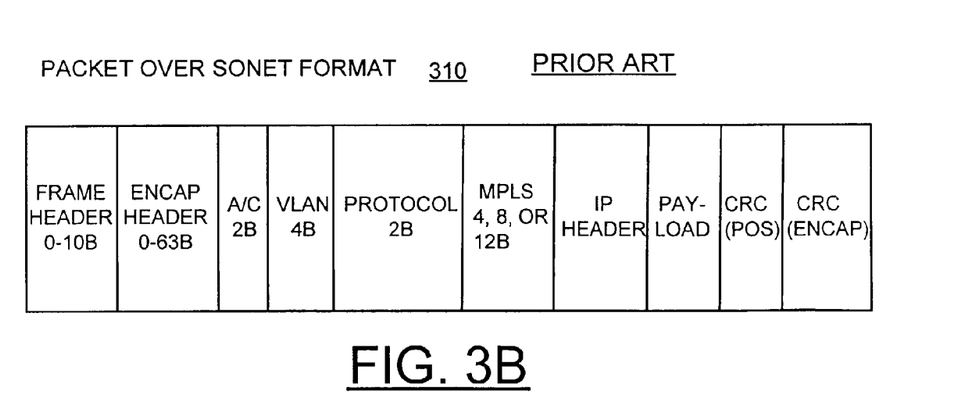

FIGS. 3A and 3B respectively illustrate a conventional format of an Ethernet frame generally designated 300 and Packet over Sonet (POS) packet generally designated 310 that include multiple header fields that can be changed, inserted or deleted using the frame alteration unit 102 in accordance with the preferred embodiment.

Figure 4:
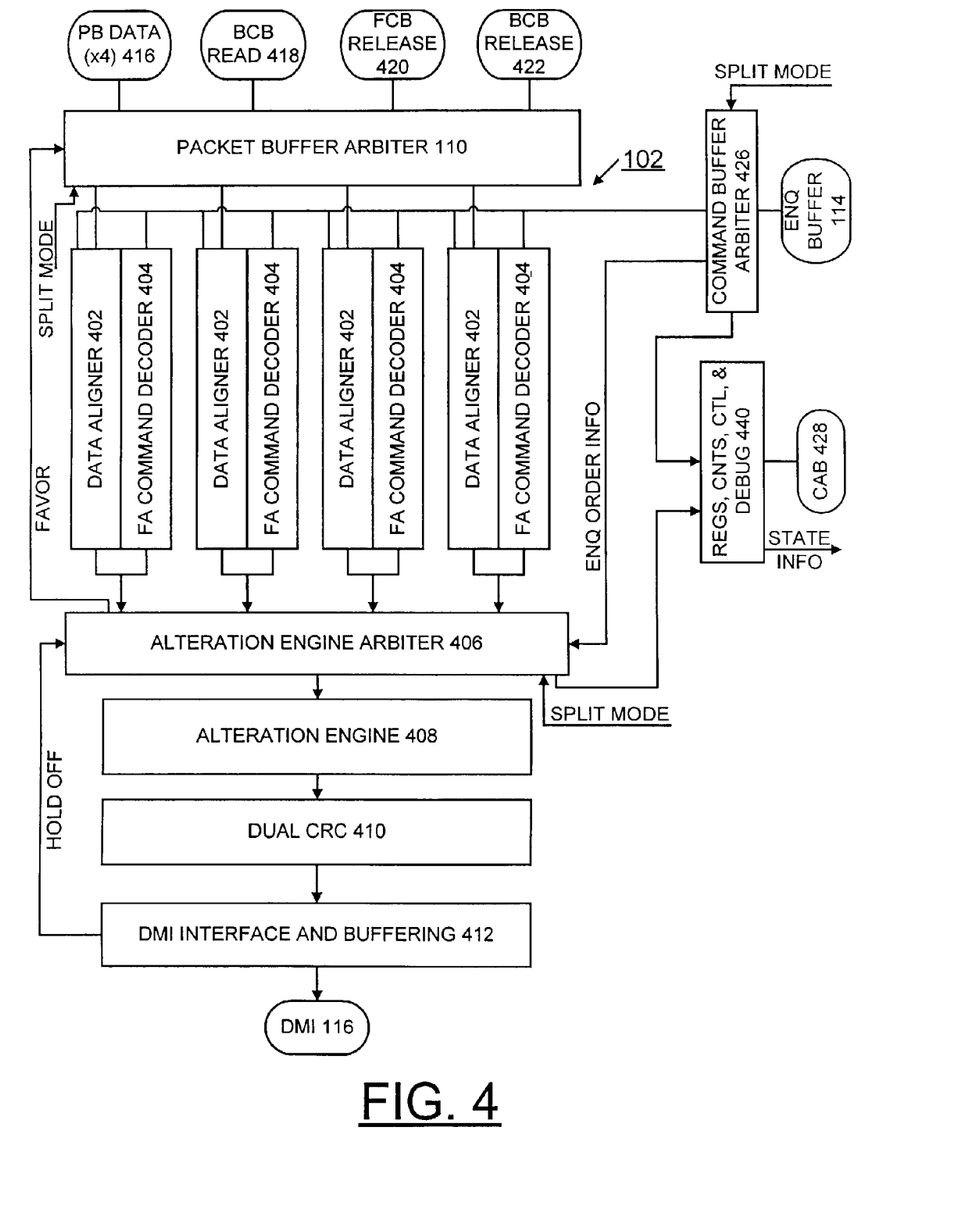
FIGS. 4 and 5 are block diagrams illustrating a frame alteration unit (FAU) of the data and storage network processor of FIG. 1 in accordance with the preferred embodiment.

Referring now to FIG. 4, frame alteration unit 102 includes a plurality of pairs of a data aligner 402 and a frame alteration (FA) command decoder 404 coupled to an alteration engine arbiter 406. The packet buffer arbiter 110 is coupled to each of the four data aligners 402 providing packet buffer data. Frame alteration unit 102 includes an alteration engine 408 coupled to a dual cyclic redundancy check (CRC) block 410 and a dataflow message interface (DMI) and buffering block 412. Interconnects to the frame alteration unit 102 are shown in oval shapes.

The dataflow message interface (DMI) 116 is coupled to the DMI and buffering block 412. A packet buffer (PB) data 416, a buffer control block (BCB) read 418 and a frame control block (FCB) release 420 are coupled to the packet buffer arbiter 110. The enqueue buffer 114 is coupled to a command buffer arbiter 426. The command buffer arbiter 426 is coupled to each of the data aligners 402 and the frame alteration command decoders 404 providing FA commands and frame descriptors. A control access bus (CAB) interface 428 is coupled to configuration registers, counts, control, and debug logic 430 that provides state information. A split mode control signal indicated at lines labeled SPLIT MODE is applied the packet buffer arbiter 110, command buffer arbiter 426, and alteration engine arbiter 406. DMI and buffering block 412 applies a timing control signal to the alteration engine arbiter 406 indicated at a line labeled HOLDOFF. Command buffer arbiter 426 applies an enqueue control signal to the alteration engine arbiter 406 indicated at a line labeled ENQUEUE ORDER INFO. The alteration engine arbiter 406 applies a control signal to the packet buffer arbiter 110 indicated at a line labeled FAVOR.

Figure 5:
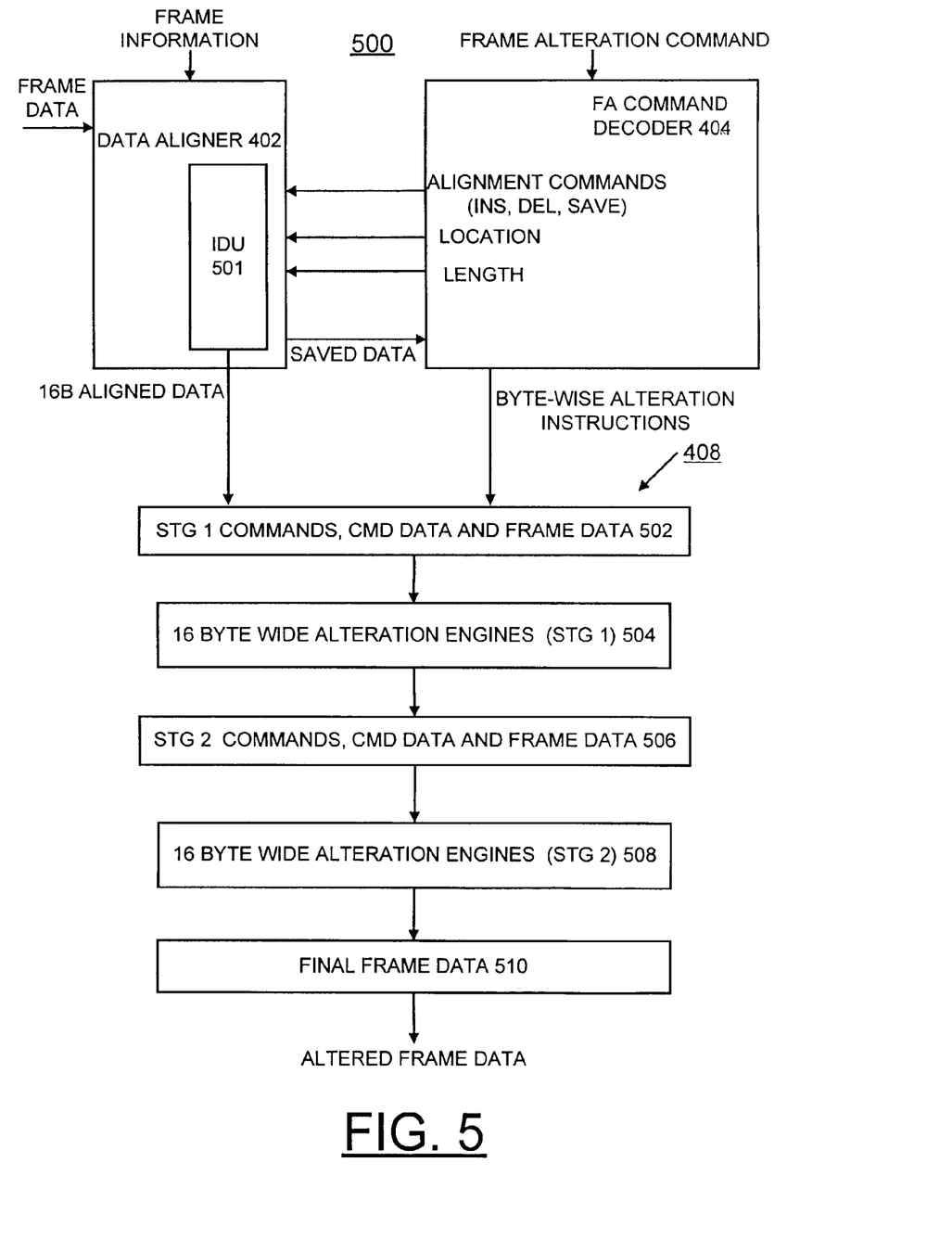

Referring also to FIG. 5, there is shown one pair of the data aligner 402 and frame alteration (FA) command decoder 404 generally designated 500 coupled to an alteration engine arbiter 406. Data aligner 402 receives frame information and frame data from packet buffer 106 in segments of 1 to 64 bytes each transfer, concatenates the frame data together, and realigns the frame data to make space for data inserts or remove data for deletes as instructed by the FA command decoder 404. At its output, the data aligner 402 provides 16 bytes (16B) of aligned data per cycle. FA command decoder 404 decodes the commands sent to the frame alteration unit 102, and provides individual inserts and delete instructions to the data aligner 402 indicated at a line ALGINMENT COMMANDS (INS, DEL, SAVE). A position and length of each insert, delete and save instruction also is provided by FA command decoder 404 to the data aligner 402. There can be multiple inserts and deletes per frame, for example, six inserts and deletes per frame depending on the type of headers the frame needs. Data aligner 402 provides save data to the FA command decoder 404 indicated at a line labeled SAVE DATA including a portion of one or more deletes per frame that is needed for providing the required final frame data, for example, to provide an updated time-to-live (TTL) value.

Data aligner 402 includes an insertion and deletion unit (IDU) 501 receiving the inserts and delete instructions together with the position and length from the FA command decoder 404. Alteration engine 408 includes a first stage commands, command data and frame data registers 502 receiving first and second stage aligned data per cycle from the data aligner IDU 501 and first and second stage bytewise alteration instructions from the FA command decoder 404. Alteration engine 408 includes a first stage of 16 byte wide alteration engines 504 having an input coupled to the first stage commands, command data and frame data registers 502 and an output coupled to a second stage commands, command data and frame data registers 506. Alteration engine 408 includes a second stage of 16 byte wide alteration engines 508 having an input coupled to the second stage commands, command data and frame data registers 506 and an output coupled to a final frame data registers 510 providing the altered frame data.

FA command decoder 404 also provides byte-wise alteration instructions, such as 32 byte-wise micro commands, each cycle to the alteration engine 408. FA command decoder 404 also provides the operands for these commands. The micro commands enable operations such as load, add, and, or, move, and the like used by the two-stage byte-wise alteration engines 504 and 508 forming the alteration engine 408 to actually perform the alterations or combine new header data into the stream of frame data. The micro commands can be used to load in value of fields that were inserted using the IDU 501, overlay values to certain fields, increment or decrement fields, as well as numerous other frame alterations commonly used in networking protocols. As with the IDU 501, these alteration engines 504 and 508 provide the flexibility to work with a variety of protocols, with the command decoder 404 providing the alteration commands for both the IDU 501 and the alteration engines 504 and 508.

Figure 6:
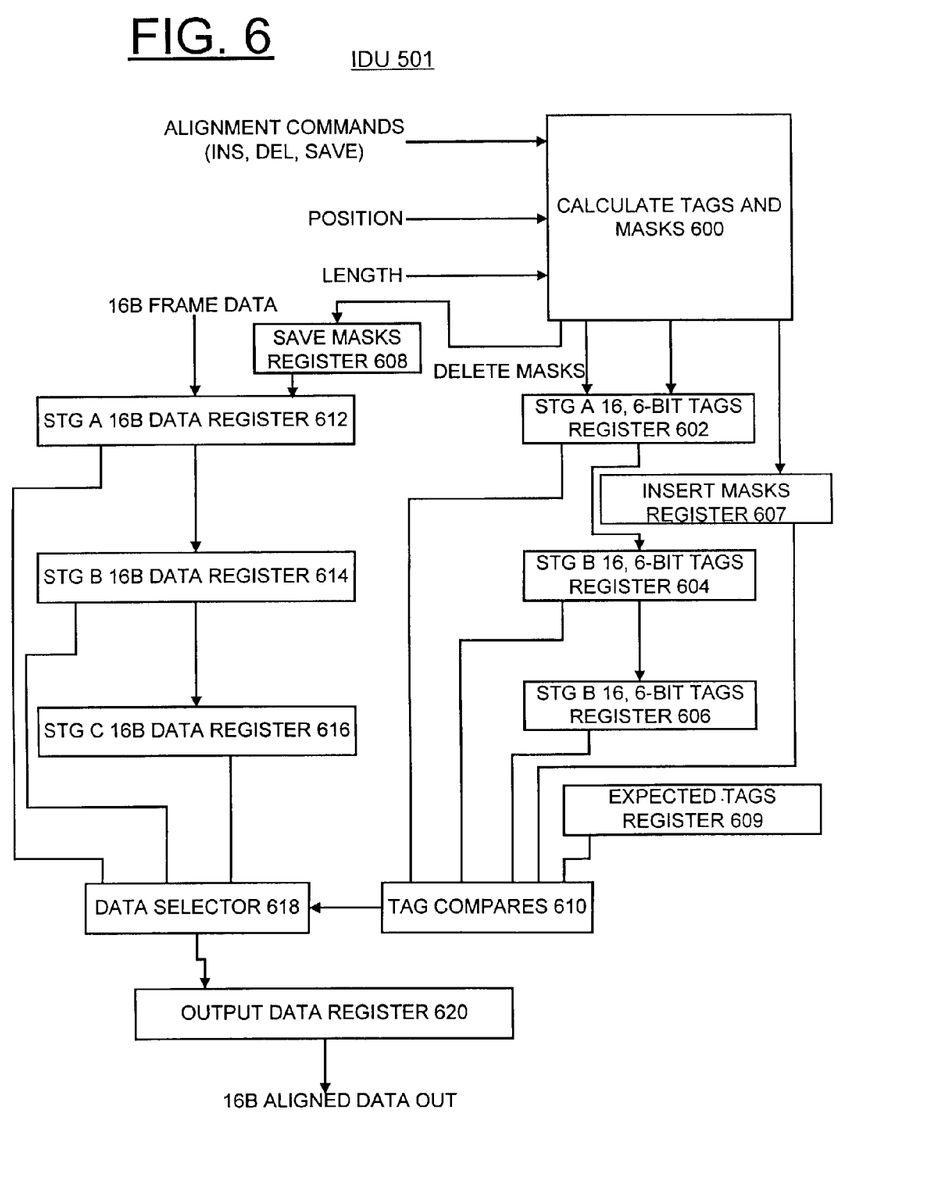
FIG. 6 is a block diagram illustrating an insert and delete unit (IDU) of the frame alteration unit (FAU) of FIGS. 4 and 5 in accordance with the preferred embodiment.

Referring now to FIG. 6, there is shown the insert and delete unit (IDU) 501 of the preferred embodiment. In accordance with features of the invention, IDU 501 is a pipelined data insertion and deletion unit having the ability to support multiple independent flows and to perform a combination of multiple inserts and deletes at arbitrary locations and of arbitrary lengths, such as a combination of five such inserts and deletes. IDU 501 is a fixed length pipeline. IDU 501 also has the ability to save any necessary data.

IDU 501 includes a calculate tags and masks function 600 that receives inputs of a plurality of groups of commands, positions and lengths, such as, five groups of commands, positions and lengths. The received command is either insert or delete. The position is the byte number at which the insert or delete takes place. The byte position is with respect to the input frame. The length specifies, in bytes, how much data is to be inserted or deleted. IDU 501 can additionally receive six save commands. The save commands require just a position and will save the selected frame data for future use by the FAU 102.

IDU 501 includes a plurality of registers, STG A 602, STG B 604, and STG C 606 sequentially receiving sixteen 6-bit tags and a 16-bit delete mask. An insert masks register 607 and a save masks register 608 and an expected tags register 609 are coupled to the calculate tags and masks function 600. A tag compares 610 is coupled to and compares the register values of each of the registers STG A 602, STG B 604, STG C 606, and the insert masks register 607 with the expected tags register 609. IDU 501 includes a plurality of 16B data registers STG A 612, STG B 614, STG C 616 sequentially receiving 16B frame data. The save masks register 608 is coupled to the 16B data registers STG A 612. A data selector 618 is coupled to the tag compares 610 selects 16B data from one of the 16B data registers STG A 612, STG B 614, STG C 616 and latching that selected 16B data to an output data register 620. The insert and save masks registers 607, 608 and the expected tags register 609 are changed with each 16B of aligned data output.

With the insert and delete command information, the calculate tags and masks function 600 of IDU 501 creates sixteen 6-bit tags and a 16-bit delete mask per cycle and sends the sixteen 6-bit tags and the 16-bit delete mask to the stage A register 602. The 6-bit tag corresponds to the last 6 bits of the output position for the input byte. For example, assume that a delete of 4 bytes at position 7 needs to be performed. The tags that are created and sent with the data are:

Tags: 1 2 3 4 5 6 6 6 6 6 7 8 9 10 11 12
Delete Mask: 0 0 0 0 0 0 1 1 1 1 0 0 0 0 0 0

If 4-bytes were being inserted at the same position 7, then the tags are:

Tags: 1 2 3 4 5 6 11 12 13 14 15 16 17 18 19 20

The expected tags register 608 contains the 6 bit tag for the output data. If one of the tags in the three stages STG A 602, STG B 604, STG C 606 matches the expected output tag for that position and it does not have a delete mask bit turned on or an insert mask bit turned on, then that data is latched into the output data register 620. Once 16 bytes of valid data are captured in this manner, then the data is sent out from the output data register 620 and the expected tags stored in register 608 are incremented by 16. As a result, the last 4 bits of the output register 620 are constant and the highest order 2 bits are the same and increment after 16 bytes of valid data are latched.

The output data register 620 provides an aligned data output data stream with each input data byte provided in the proper output location. The deleted data is gone, while space is made for any inserted data to be overlayed.

The saving of data is performed by creating the save masks 608 and latching the data before the input to stage A 612. This is used in case data that is to be deleted is needed for frame alterations in other parts of the frame.

IDU 501 of FAU 102 effectively enables the insertion and deletion of frame data while maintaining bandwidth, minimizing complexity, maximizing flexibility and preserving a gap-free stream of aligned output data. Since the inputs to the IDU 501 are fully generic, IDU 501 can be used to implement alterations for a variety of networking protocols. IDU 501 can also be used to segment long streams of data into smaller segments separated by inserted headers, with care taken to avoid feeding in more data into the pipeline than necessary.

It should be understood that IDU 501 is not limited to the illustrated arrangement of FIG. 5, for example, additional tag bits can be added as needed for performing alterations on different independent frames, or for supporting large amounts of deleted data.

In a multi-protocol label switching (MPLS) network, incoming packets are assigned a label by a label edge router (LER). Packets are forwarded along a label switch path (LSP) where each label switch router (LSR) makes forwarding decisions based solely on the contents of the label. At each hop, the LSR strips off the existing label and applies a new label which tells the next hop how to forward the packet. Label Switch Paths (LSPs) are established by network operators for a variety of purposes, such as to guarantee a certain level of performance to route around network congestion, or to create IP tunnels for network-based virtual private networks. In many ways, LSPs are similar to circuit-switched paths in ATM or Frame Relay networks, except that LSPs are not dependent on particular Layer 2 technology. An LSP can be established that crosses multiple Layer 2 transports such as ATM, Frame Relay or Ethernet. Thus, one of the true promises of MPLS is the ability to create end-to-end circuits, with specific performance characteristics, across any type of transport medium, eliminating the need for overlay networks or Layer 2 only control mechanisms.

Frame alteration unit 102 can be used to perform MPLS, LER and LSR functionally within the network processor 100 to perform changes to the MPLS packet at peak performance instead of going through conventional long software paths.

Frame alteration unit 102 also provides a flexible approach to implement unforeseen MPLS uses by allowing the capability to deal with multiple labels and all fields within a label.

Figure 7:
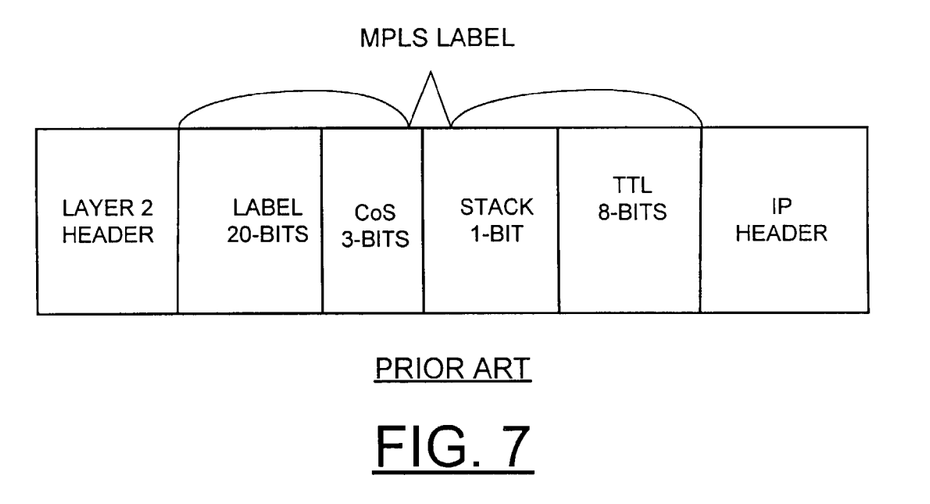
FIG. 7 is a diagram illustrating a conventional label format of a Multi-Protocol Label Switching (MPLS) packet that includes multiple fields that can be changed, inserted or deleted using the frame alteration unit (FAU) in accordance with the preferred embodiment.

Referring now to FIG. 7, a conventional Label format of a Multi-Protocol Label Switching (MPLS) packet that includes multiple fields that can be changed, inserted or deleted using the frame alteration unit 102 in accordance with the preferred embodiment. The 32-bit MPLS Label is located after the Layer 2 header and before the IP header. As shown in FIG. 7, the MPLS Label contains multiple fields including a label field of 20-bits that carries the actual value of the MPLS Label; a CoS field of 3-bits that can affect the queuing and discard algorithms applied to the MPLS packet as it is transmitted through the network; a 1-bit Stack field that supports a hierarchical label stack and a TTL (time-to-live) field of 8-bits that provides conventional IP TTL functionality.

When entering an MPLS network, the LER typically inserts one MPLS Label between the Layer 2 and Layer 3 headers. Frame alteration unit 102 supports the insertion of multiple MPLS labels. The TTL field within the labels is copied from the IP TTL field. This is an MPLS label insertion. An LSR will typically remove the old label, and replace it with a new label. The TTL is decremented, the CoS bit can be changed and the S bit is usually preserved. This is an MPLS label swap. When leaving the MPLS network, all remaining MPLS labels will be removed. The TTL field will be copied back from the top MPLS label to the IP TTL field. This is an MPLS label delete.

Frame alteration unit 102 can perform multiple MPLS label inserts, deletes and swaps, with the option of changing or preserving the CoS, stack and TTL fields as well as the 20-bit label.

MPLS alterations commands are applied to the FA command decoder 404 of the FAU 102. The DPPUs 104 in the network processor 100 generates the MPLS alterations commands. The commands specify what sort of MPLS alterations need to be performed (inserts, swaps or deletes), the number of labels to be swapped, inserted or deleted (or a combination of swaps with inserts or deletes), what to do with the TTL, S-bit and CoS fields, label data, and the locations of the Layer 2 and Layer 3 headers.

The FA command decoder 404 decodes the MPLS alterations commands into a collection of insert/delete/save commands for the IDU 501. The commands given to the IDU 501 have the following 3 forms: 1.) Insert, Location, Length that is used for MPLS pushes and can support any number of MPLS labels; 2.) Delete, Location, Length that is used for MPLS Pops; and 3.) Save, Location that is used for a byte-wise save of either old MPLS TTLs before they are deleted, an IP TTL, or IPv4 checksums if updating is needed.

IDU 501 provides aligned data with the proper formatting. Deleted data is removed and space is provided for inserted data. IDU 501 will also provide the FA command decoder 404 with a saved data, such as the MPLS TTL, if necessary. The IDU output 16B of aligned data is applied to the alteration engines 504, 508.

FA command decoder 404 provides the alteration engines 504, 508 with the proper byte-wise alteration commands to perform the necessary alteration commands. For inserting labels, FA command decoder 404 provides the label data. Using either the save function of the IDU 501 or the save and load functions of the alteration engines 504, 508, the IP TTL is copied to the MPLS TTL if necessary.

For an MPLS Swap, FA command decoder 404 gives the alteration engines 504, 508 load commands for the swapped label, and a combination of AND and OR commands to change or preserve the CoS or stack fields. The TTL field can be decremented using the Aes ADD command or loaded in if desired.

For the MPLS Pop, FA command decoder 404 receive the popped TTL from the IDU 501, then the popped TTL is provided into the proper location using a LOAD command to one of the alteration engines 504, 508. The TTL can be decremented in alteration engines 508 with an ADD command. If the final MPLS label was popped, then FA command decoder 404 can place the TTL into the IP TTL field in the same way. In the case of an IPv4 packet, the incremental checksum update can be calculated either using the alteration engine ADD commands, or calculated internally in the FA command decoder 404 using the IDU save data and then loaded into the proper location.

While the present invention has been described with reference to the details of the embodiments of the invention shown in the drawing, these details are not intended to limit the scope of the invention as claimed in the appended claims.

What is claimed is:

1. Apparatus for implementing frame header alterations in a network processor comprising:
   a packet buffer storing incoming packet frame data and frame information for data frames, and queuing data frames;
   a command decoder receiving and decoding frame alteration commands and providing frame alignment commands and alteration instructions; said frame alignment commands and alteration instructions including at least one of insert, delete and save and a position and length of each said at least one of insert, delete and save;
   a data aligner coupled to said packet buffer receiving frame information and frame data and coupled to said command decoder receiving said frame alignment commands; said data aligner including an insert and delete unit sequentially receiving a predefined number of bytes of frame data, selectively latching data bytes of said received frame data responsive to said frame alignment commands and sequentially providing an aligned frame data output of said predefined number of bytes; said aligned frame data output selectively including one or more inserts, and one or more deletes;
   said data aligner selectively providing save frame data to said command decoder responsive to said frame alignment commands; and
   an alteration engine coupled to said data aligner receiving said sequentially provided aligned frame data output and coupled to said command decoder receiving said alteration instructions and providing sequential altered frame data responsive to said received alteration instructions.

2. Apparatus for implementing frame header alterations in a network processor as recited in claim 1 wherein said insert and delete unit includes a calculate function receiving said frame alignment commands and calculating tags, delete masks, insert masks and save masks.

3. Apparatus for implementing frame header alterations in a network processor as recited in claim 2 wherein said insert and delete unit includes a plurality of pipelined tags and delete masks registers coupled to said calculate function sequentially receiving said tags and said delete masks; a register coupled to said calculate function sequentially receiving said insert masks and a register coupled to said calculate function sequentially receiving save masks.

4. Apparatus for implementing frame header alterations in a network processor as recited in claim 3 wherein said insert and delete unit includes a register storing an expected tag for an output data byte; and a tag compares for comparing said stored tags and said expected tag to identify a match and responsive to a delete mask bit for said match being off for providing a data byte select signal.

5. Apparatus for implementing frame header alterations in a network processor as recited in claim 4 wherein said insert and delete unit includes a plurality of pipelined data registers sequentially receiving said predefined number of bytes of frame data and a data selector coupled to said plurality of data registers; said data selector responsive to said data byte select signal for latching a selected data byte of said of said stored frame data.

6. Apparatus for implementing frame header alterations in a network processor as recited in claim 4 wherein said insert and delete unit includes a data output register coupled to said data selector receiving said latched data bytes and sequentially providing said aligned frame data output of said predefined number of bytes.

7. Apparatus for implementing frame header alterations in a network processor as recited in claim 4 wherein said plurality of pipelined data registers include three pipelined data registers.

8. Apparatus for implementing frame header alterations in a network processor as recited in claim 4 wherein said plurality of pipelined tags and delete masks registers include three pipelined tags and delete masks registers.

9. Apparatus for implementing frame header alterations in a network processor as recited in claim 1 wherein said alteration engine responsive to said received alteration instructions and said save frame data, altering said sequentially provided aligned frame data output and providing sequential altered frame data and said save frame data.

10. A method for implementing frame header alterations in a network processor including a plurality of distributed pico processor units (DPPUs) generating frame alteration commands coupled to a frame alteration unit, said method comprising the steps of:
    decoding frame alteration commands and providing frame alignment commands and alteration instructions; said frame alignment commands and alteration instructions including at least one of insert, delete and save and a position and length of each said at least one of insert, delete and save;
    sequentially receiving a predefined number of bytes of frame data,
    sequentially storing a pipeline of said sequentially received predefined number of bytes of frame data;
    selectively providing save frame data responsive to said frame alignment commands;
    selectively latching data bytes of said stored frame data responsive to said frame alignment commands;
    sequentially providing an aligned frame data output of said predefined number of bytes; said aligned frame data output selectively including one or more inserts, and one or more deletes; and
    altering said sequentially provided aligned frame data output responsive to said received alteration instructions.

11. A method for implementing frame header alterations in a network processor as recited in claim 10 wherein the steps of sequentially receiving said predefined number of bytes of frame data includes the steps of sequentially receiving sixteen bytes of frame data.

12. A method for implementing frame header alterations in a network processor as recited in claim 11 wherein the steps of sequentially storing said pipeline of said sequentially received predefined number of bytes of frame data includes the steps of sequentially storing said pipeline of three of said sequentially received sixteen bytes of frame data.

13. A method for implementing frame header alterations in a network processor as recited in claim 12 wherein the step of selectively latching data bytes of said stored frame data responsive to said frame alignment commands includes the steps of utilizing said frame alignment commands, sequentially calculating tags, delete masks, insert masks and save masks.

14. A method for implementing frame header alterations in a network processor as recited in claim 13 includes the steps of sequentially storing a pipeline of said sequentially calculated tags and delete masks; storing an expected tag for an output data byte; and comparing said stored calculated tags and said expected tag to identify a match and responsive to a delete mask bit for said match being off and an insert mask bit for said match being off, providing a data byte select signal.

15. A method for implementing frame header alterations in a network processor as recited in claim 14 includes the steps of responsive to said data byte select signal, latching a selected data byte to an output data register.

16. A method for implementing frame header alterations in a network processor as recited in claim 15 wherein the steps of sequentially providing said aligned frame data output of said predefined number of bytes includes the steps of identifying said predefined number of bytes in said output data register and providing said aligned frame data output of said predefined number of bytes.

17. A method for implementing frame header alterations in a network processor as recited in claim 10 wherein the steps of altering said sequentially provided aligned frame data output responsive to said received alteration instructions includes the steps of altering said sequentially provided aligned frame data output and said save frame data responsive to said received alteration instructions.

* * * * *